Dec. 30, 1947.  L. H. COLLINS ET AL  2,433,740
ELECTRICAL VIBRATOR
Filed Feb. 26, 1946  3 Sheets-Sheet 1
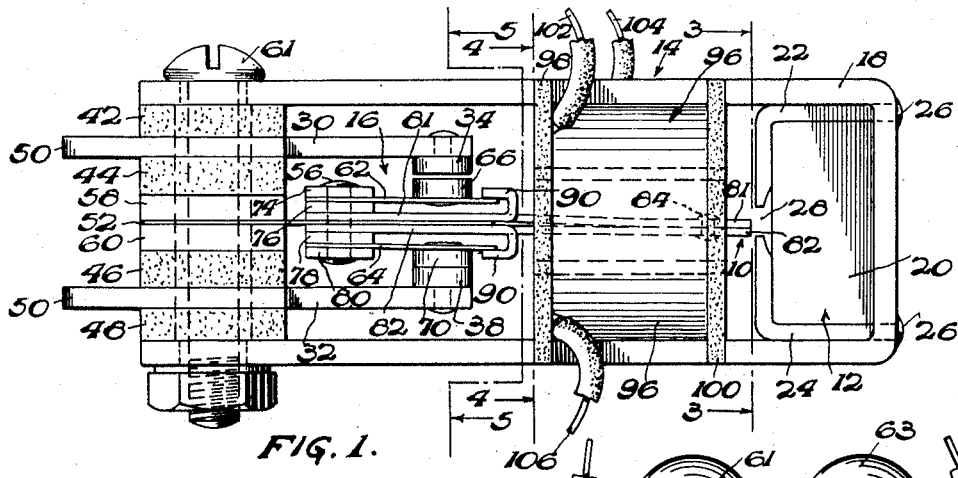
FIG. 1.
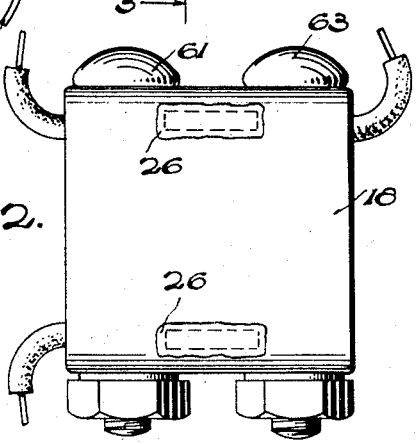
FIG. 2.
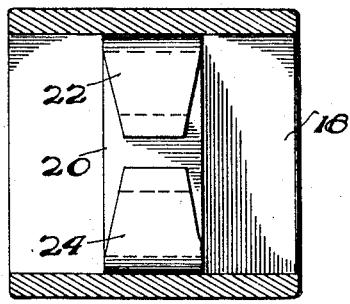
FIG. 3.
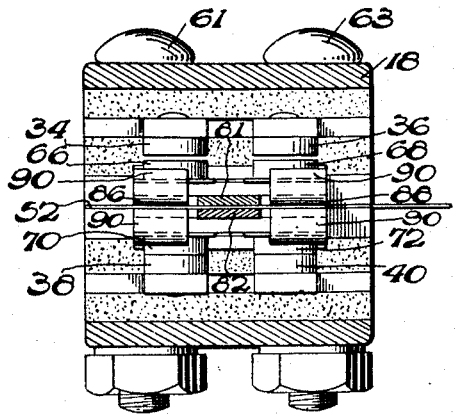
FIG. 5.
FIG. 4.
Inventors
Laurence H. Collins
Edwin C. Smith
By Scrivener & Parker
Attorneys
Witness
Porter H. Flautt Dec. 30, 1947.  L. H. COLLINS ET AL  2,433,740
ELECTRICAL VIBRATOR
Filed Feb. 26, 1946  3 Sheets-Sheet 2

Inventors
Laurence H. Collins
Edwin C. Smith
By Scrivener & Parker
Attorneys

Witness

Dec. 30, 1947. L. H. COLLINS ET AL 2,433,740
ELECTRICAL VIBRATOR
Filed Feb. 26, 1946 3 Sheets-Sheet 3
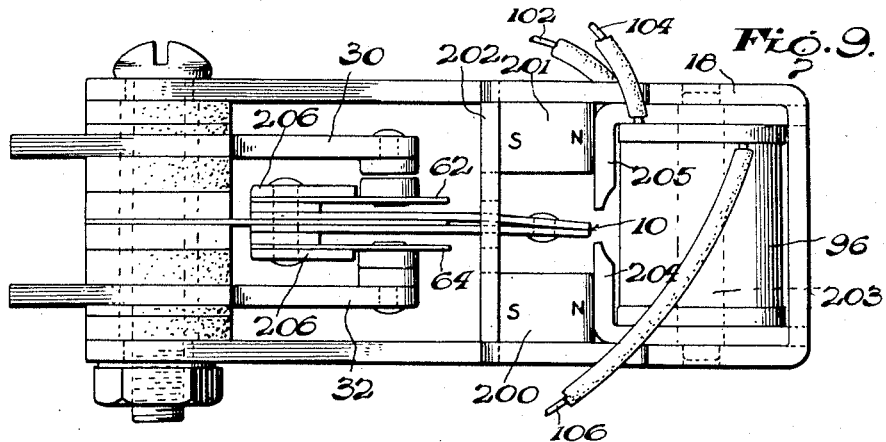
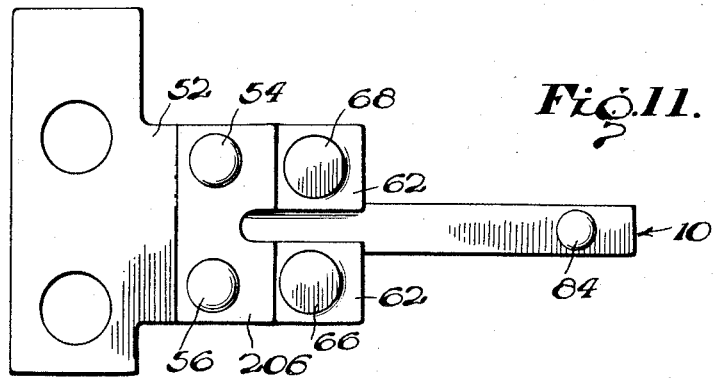
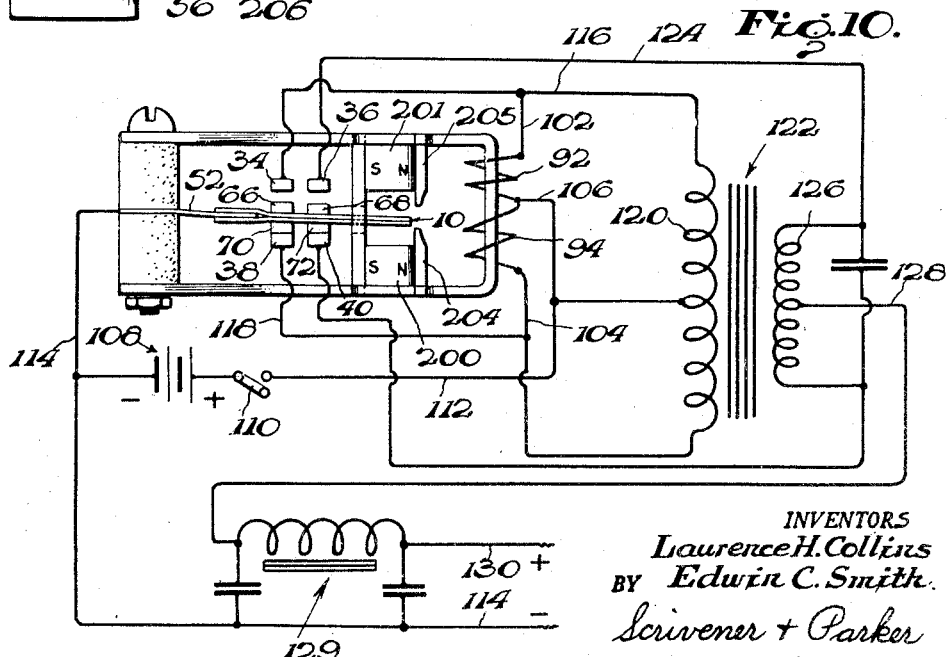
INVENTORS
Laurence H. Collins
BY Edwin C. Smith
Scrivener + Parker
Attorneys

Patented Dec. 30, 1947

2,433,740

UNITED STATES PATENT OFFICE 2,433,740

ELECTRICAL VIBRATOR

Laurence H. Collins and Edwin Comer Smith, Baltimore, Md.

Application February 26, 1946, Serial No. 650,360

8 Claims. (Cl. 172—126)

This invention relates to polarized electrical vibrators and more particularly to a device of this character which operates at a relatively high speed and which may be advantageously employed for converting a low voltage direct current to a high voltage pulsating current or may be utilized as a self-rectifying or synchronous vibrator.

In our prior application for Vibrator, Serial No. 484,318 filed April 23, 1943, a novel electrical vibrator is disclosed which is so constituted that the frequency of vibration thereof is of the order of four hundred cycles per second, this high frequency being obtained by a construction wherein the armature is caused to positively vibrate by the inter-action of a unidirectional magnetic field and a magnetic field created by polarization of the armature, the latter field being reversed by connections controlled by movement of the armature.

The present invention constitutes an improvement on the invention of the prior application and is particularly directed to the novel features hereinafter set forth.

One of the objects of the present invention is to provide a novel electrical vibrator which may be of the rectifying or synchronous type and which is so constituted that exceedingly light weight and low cost circuit components may be employed therewith, thereby resulting in a material saving in weight, space and cost of power packs incorporating the vibrator of the present invention.

Another object is to provide in an electrical vibrator of the foregoing type, a novel construction of parts which results in a relatively high frequency of operation of the order of four hundred cycles per second or more.

Still another object is to provide a novel construction for an electrical vibrator wherein the armature thereof is polarized and cooperates with a unidirectional field, the arrangement being such that the electromagnetic interaction of the polarized armature and the unidirectional field secures a positive drive for the armature in order to provide high speed vibration thereof.

A still further object includes the provision of a novel and improved contact construction for an electromagnetic vibrator of the foregoing type, wherein a reduced contact resistance and consequent higher efficiency of operation is achieved.

Another object comprehends a novel arrangement for deriving the unidirectional field for cooperating with the polarized armature, the construction being of such nature that the free end of the armature vibrates in a path displaced to one side of the pole pieces without any danger of contact with the pole pieces, thus utilizing the unidirectional field more effectively and securing an added saving in size and weight of the components comprising the unidirectional field.

A further object comprises a novel contact construction including contacts carried by the armature which cooperate with stationary contacts, together with an arrangement for securing a more positive operation of the contacts and the elimination of any undesirable frequencies in the movable contact supports with respect to the fundamental frequency of vibration of the armature.

Still another object resides in a novel vibrator of the foregoing character which is of relatively light weight construction and is so constituted as to be capable of ready manufacture at a relatively low cost.

Other objects and novel features of the invention will appear more fully hereinafter from a consideration of the following description when taken in connection with the accompanying drawings, wherein several forms of the invention are illustrated. It is to be expressly understood, however, that the drawings are utilized for purposes of illustration only, and are not to be taken as a definition of the limits of the invention, reference being had for this latter purpose to the appended claims.

In the drawings wherein similar reference characters refer to like parts throughout the several views:

Fig. 1 is a side view of the novel vibrator constructed in accordance with the present invention;

Fig. 2 is an end view of the vibrator;

Fig. 3 is a transverse sectional view taken substantially along line 3—3 of Fig. 1 and illustrates the shape of the pole pieces with which the free end of the armature cooperates during operation of the vibrator;

Fig. 4 is a transverse sectional view taken substantially along line 4—4 of Fig. 1 and shows the normal position of the free end of the armature with respect to the pole pieces;

Fig. 5 is a transverse sectional view taken substantially along line 5—5 of Fig. 1 and illustrates the normal position of the armature wherein the movable contacts carried thereby are engaged with one of the sets of stationary contacts;

Fig. 9 is a side view of a modified form of vibrator;

Fig. 10 is a circuit diagram illustrating the manner of using the vibrator of Fig. 9 as a synchronous or self-rectifying vibrator, and Fig. 11 is a plan view of a modified form of vibrating armature and contact assembly which may be used with both of the vibrators of Figs. 1 and 9.

Figure 8:
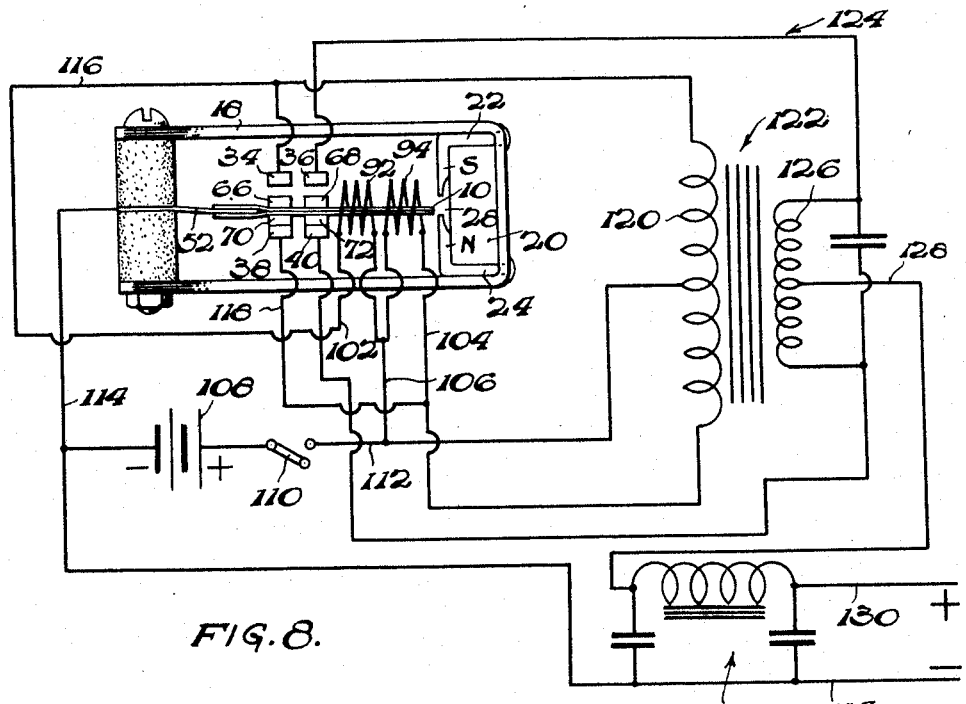
Fig. 8 is a circuit diagram illustrating the manner in which the novel vibrator is connected to function as a synchronous or self-rectifying vibrator.
Figure 6:
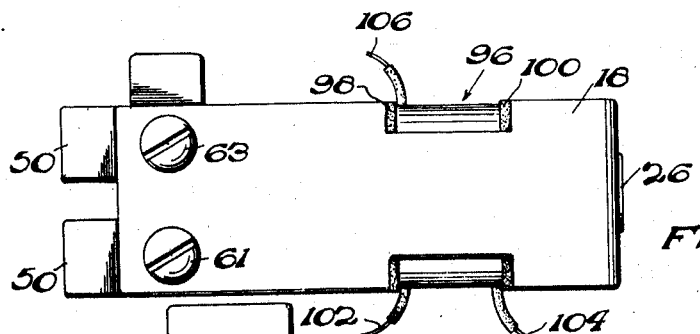
Fig. 6 is a top view of the vibrator of Fig. 1, shown in reduced scale.

Referring more particularly to Fig. 1 of the drawings, a polarized electromagnetic vibrator embodying the principle of the present invention is illustrated therein as including an armature 10 mounted to vibrate back and forth by reason of the interaction between a unidirectional magnetic field created by a magnetic means 12 and a pulsating field imposed on the free end of the armature, the latter being polarized by winding means 14, which is so arranged with respect to a switching or contact arrangement 16, that the polarization of the armature is periodically reversed in timed relation with the vibration thereof.

In the form of the invention illustrated, the component parts of the vibrator are carried by a U-shaped support 18, which may be of any suitable non-magnetic material, such as brass or aluminum for example, the closed end thereof supporting a small permanent magnet 20 having pole pieces 22 and 24 cooperating with opposite poles thereof. As shown, each of the pole pieces 22 and 24 is secured to the support 18, as by peening the ends 26 against the outer surface of the support, and is so formed as to closely embrace the magnet and to present spaced-apart oppositely poled inner ends to constitute an air gap 28 of highly concentrated field strength. The effectiveness of such gap is materially increased by tapering the inner ends of the pole pieces, as shown in Figs. 3 and 4 so that the width thereof is substantially the same as the width of the armature 10. As will be readily perceived from Fig. 1, the armature 10 vibrates in a path disposed at one side of the pole pieces 22 and 24 and thus never contacts the pole pieces during vibration. Hence, such a construction secures a highly efficient and effective utilization of the unidirectional field of the magnet since a relatively small gap and resulting highly concentrated field is achieved.

One of the important features of the present invention resides in the novel contact or switching construction 16 and its relation to the other parts of the vibrator. As shown, the contact structure 16 includes substantially rigid arms 30 and 32 which respectively carry pairs of stationary primary and secondary contacts 34, 36 on the one hand and 38, 40 on the other, see Fig. 5, the arm 30 being positioned between insulating spacers 42 and 44, while the arm 32 is disposed between similar insulating spacers 46, 48. Each arm is moreover provided with a terminal extension 50 in order to facilitate the electrical connection thereof with other components of the circuit arrangement.

Figure 7:
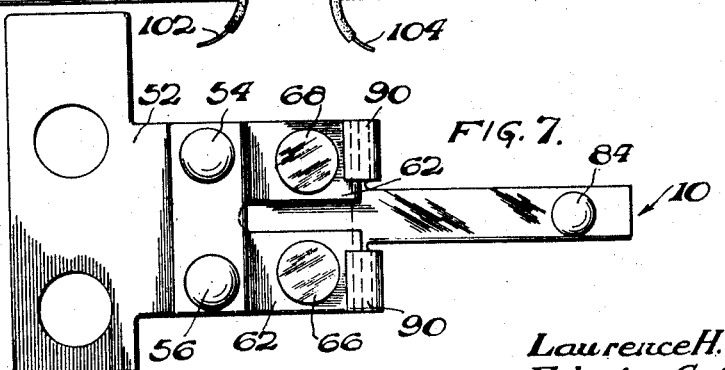
Fig. 7 is a plan view of the vibrating armature and contact assembly carried thereby.

In order to mount the armature 10 for vibration in the manner heretofore described, the latter is fixedly secured to a flexible metal supporting spring strip 52 as by means of rivets 54, 56, see Figs. 1 and 7, and such strip has its free end positioned between a pair of metallic spacer strips 58, 60. As will be seen from Figs. 1, 2 and 5, the insulating spacers 42, 44, 46, 48, the arms 30, 32, the spacers 58 and 60 and the spring strip 52 are all assembled in superposed relation and secured together by any suitable means such as bolts 61 and 63.

In order that vibration of the armature 10 may be utilized to reverse the polarization thereof, to secure the high speed operation heretofore referred to, a novel movable contact construction is carried by the armature for cooperation with the stationary contacts previously described. More particularly, see Figs. 1, 5 and 7, such construction includes a pair of spring arms 62 and 64, the former carrying movable, primary and secondary contacts 66, 68 for respective cooperation with the stationary contacts 34 and 36, while the arm 64 carries a pair of movable primary and secondary contacts 70 and 72 for respective cooperation with the stationary contacts 38 and 40. Both of the arms 62 and 64 are supported by the armature 10 through the rivets 54 and 56, suitable metallic spacers 74, 76, 78 and 80 being disposed on opposite sides of the arms 62 and 64 in order to provide a proper spacing and parallel relationship between these parts and with respect to the arms 30 and 32, as shown.

Means are provided by the present invention to insure that during vibration of the armature 10, the action of the movable contacts carried thereby will be such that free vibration of the contact spring arms at their natural frequency is effectively damped and prevented. To this end, the armature is formed by a pair of substantially rigid highly permeable metal strips 81, 82 which may be of soft iron, for example, and which are riveted together at 84 adjacent the free ends thereof. At the central and inner ends, the strip 81 is formed with a pair of laterally extending side members 86 and 88 having inturned lips 90 which form stops to limit the movement of the free end of the spring arm 62 away from the armature. Strip 82 is also provided with lips 90 in order to limit the movement of the free end of the spring arm 64 away from the armature. In assembling the spring arms 62 and 64 with respect to the armature, it is desired to point out that the said arms are preloaded or tensioned in such a manner that the free ends thereof bear against the stops or lips 90 with a slight tension. Preferably, this tension is such that when the movable contacts engage the stationary contacts, the former will not bounce or vibrate during continued travel of the armature 10, which is permitted by the lips 90. Also, as the armature returns, and the lips 90 pick up the free ends of the spring arms, there should likewise be no tendency for said ends to vibrate. During operation therefore, the lips or stops 90 constitute damping means for eliminating free vibration of the contact springs at their natural frequency. It has been determined, that a construction of this character is highly desirable in that the timing of the operation of the contacts is more positive, and all frequencies of vibration of the spring arms 62 and 64 which support the movable contacts and which frequencies are out of phase with respect to the fundamental frequency of vibration of the armature 10, are eliminated.

In order that the armature 10 may be alternately polarized in the manner heretofore stated a pair of windings 92, 94, Fig. 8, is provided. Preferably such windings comprise a single, center-tapped coil or winding 96, Fig. 1 which surrounds the free end of the armature 10 and is disposed between a pair of insulating partitions 98, 100 carried by the support 18, see Figs. 1 and 4. Such winding is provided with end terminals 102, 104 and a center terminal 106, these being arranged for circuit connection with the contacts and other circuit components in a manner to be described more fully hereinafter.

With the parts assembled as illustrated in the drawings, it will be observed that the armature 10 and the movable contact assembly are supported wholly by the spring strip 52 which extends between the arms 81 and 82 of the armature and up to a point where such arms are formed into the lips 90. Such an arrangement insures a parallel disposition of the arms 81 and 82 while the use of the spacers 74, 76, 78 and 80 secures a proper spatial relationship between arms 62 and 64 as well as a parallel disposition of these arms with respect to each other and with respect to the supporting arms 30 and 32. As will be clear from Fig. 7, the parts 81 and 82 forming the armature 10 project outwardly as an elongated substantially rigid strip, the free end of which vibrates in the highly intensified unidirectional field 28 without contacting the pole pieces 22 or 24. As shown, Fig. 1, the end of the armature 10, with the vibrator deenergized, is attracted by one or the other of the pole pieces 22 or 24 and hence the corresponding set of contacts controlled by the armature will be closed. This is a highly important feature of the invention as will appear more fully hereinafter.

Referring more particularly to Fig. 8, the present invention is diagrammatically illustrated therein as being associated with circuit components in order to function as a self-rectifying or synchronous vibrator. In such event, both primary and secondary contacts are utilized. It will be readily understood however, that the secondary contacts may be omitted, or if not omitted, not utilized if desired, in which case the vibrator may be utilized as a simple electromagnetic vibrator for converting a low voltage direct current into a high voltage pulsating current without rectification.

As shown in Fig. 8, a low voltage direct current source, which may be a storage battery 108, is provided for energizing the windings 92 and 94, the positive side of the battery being connected through a suitable switch 110 to the center terminal 106 by a connection 112. The negative or ground terminal of the battery is connected by a lead 114 with the spring support 52 and armature 10, it being understood that the movable contacts 66, 68, 70 and 72 are hence at ground potential. Lead 114 also constitutes the ground lead for the output of the rectifying circuit. Terminal 102 is connected through a lead 116 with the stationary primary contact 34 while terminal 104 is connected with the stationary primary contact 38 by a lead 118, both of these contacts being connected across the primary 120 of a step-up transformer 122 of the power pack 124. The center tap of the primary 120 is connected with the lead 112 and thus the circuit connections are complete for the conversion of the relatively low voltage direct current source 108 to a relatively high voltage pulsating current, which may be taken off from the terminals of the secondary 126.

In the event that it is desired to utilize the vibrator for synchronous rectification, the secondary contacts 36 and 40 are connected across the secondary 126, the center tap 128 of the latter being connected through a suitable filter 129 to an output lead 130, in well known manner.

In operation, and assuming that the parts are connected and positioned as shown in Fig. 8, it will be observed that the free end of the armature 10 is drawn toward the pole piece 24, which for purposes of illustration may be denoted as a north pole N. Under these conditions, the contacts 38, 70 and 40, 72 are engaged and the connections are such that upon the closing of switch 110, the winding 94 will be energized in order to polarize the free end of the armature 10 in such manner that it will become a north pole. Such energization will be effected by way of the battery 108, switch 110, connection 112, terminal 106, winding 94, and back to the negative side of the battery by way of leads 104, 118, engaged contacts 38, 70, armature 10 and lead 114. At the same time, it will be noted that the lower half of the primary winding 120 will be energized from the battery 108, through connections 112, 104, 118 and the closed contacts 38, 70, and the primary winding 120, including upper and lower halves thereof will hence function as the secondary of an auto-transformer having a 2:1 step-up ratio. The induced voltage across the primary winding 120 will then be substantially twice that of the battery 108 and since this induced voltage is impressed across both windings 94 and 92 in series, it will be seen that winding 92 is so energized as to polarize the armature 10 in the same sense as that caused by the energization of the winding 94 as heretofore stated. The polarizing effect of the two windings 94 and 92 is thus additive under the aforementioned conditions.

With the aforesaid circuit connections completed, the armature 10 will be repelled by the adjacent north pole N and attracted toward the south pole S, the latter poles being respectively constituted by the pole pieces 24 and 22. As the armature end moves toward the south pole S, primary contacts 38, 70 are broken and contacts 34, 66 are engaged for the purpose of causing a reversal of the current flow through the windings 92 and 94 to thereby reverse the polarization of the end of the armature 10. This will be readily understood, since it will be observed that when contacts 66 and 34 are closed, the winding 92 and the upper half of the transformer primary winding 120 are connected in parallel across the battery 108, while the induced voltage of the winding 120 functioning as the secondary of an auto-transformer, is again impressed across the windings 92 and 94, in reversed sense. Upon completion of the aforesaid connections, it will be appreciated that the armature is polarized in an opposite sense and the free end thereof is now repelled by the south pole S and attracted toward the north pole N. Hence, by reason of the construction provided, the armature is caused to positively vibrate, the interaction between the unidirectional field in the air gap 28 and the reversal of the polarization of the armature 10 giving rise to reversed and simultaneously acting repelling and attracting forces which cause the vibration to take place at a relatively high frequency. It will be especially noted that the vibration is positively effected at all times and does not depend upon the resiliency of a tuned reed as in certain prior art devices, it being pointed out in this connection that the armature 10 is of substantially rigid construction throughout, and vibrates on the spring arm mounting 52, which in effect constitutes a spring hinge.

It will be understood that during the aforementioned vibration of the armature, a substantially high voltage pulsating current will be induced in the secondary 126, which may be rectified in well-known manner through the synchronized making and breaking of the secondary contacts 36, 68 on the one hand and contacts 40, 72 on the other. However, as heretofore pointed out, the secondary contacts may be eliminated if desired, since the invention is not limited in its use to application as a synchronous vibrator, but may be employed for a variety of uses whereever a high frequency electromagnetic vibrator is indicated.

A modified form of vibrator is illustrated in Figs. 9-11, which while operating in accordance with the same general principles as that previously described, still is slightly different in its specific details. In effect, the form of Fig. 9 constitutes a reversal of parts of the previous form, insofar as the unidirectional and alternating fluxes is concerned.

Referring more particularly to Fig. 9, the armature 10 thereof is constantly subjected to the action of a pair of permanent magnets 200 and 201 which are so mounted that their poles will aid each other in polarizing the armature through a slotted yoke 202. Winding 96, instead of being employed for polarizing the armature 10, as in the previous form, is mounted in the frame 18 upon a core 203 which is provided with pole pieces 204 and 205. The ends of the pole pieces are arranged in close proximity to the end of the armature 10, in the same manner as the ends of the pole pieces 22 and 24 of Fig. 1, and from this construction, it will be understood that the magnetic circuit of the winding 96 and the magnetic circuit of the permanent magnets 200 and 201 are in parallel. As in the previous form, the winding 96 includes sections 92 and 94, see Fig. 10, which are associated with the primary contacts 34, 66 and 38, 70, so that during vibration of the armature, the current flow through the sections is periodically reversed.

It will be understood that in the form of the invention illustrated in Fig. 9, the armature 10 is polarized by the unidirectional field produced by the permanent magnets 200 and 201, and that the free end thereof is subjected to an alternating magnetizing field produced by the currents flowing through the windings 92 and 94. Thus Fig. 9 is in effect, a reversal of the previously described construction wherein the polarization of the armature is periodically reversed by the alternating magnetic field, while the free end is constantly subjected to the action of a unidirectional magnetic field.

In operation, and referring to Fig. 10, it will be observed that the circuit diagram is identical with that of Fig. 8. Assuming that the magnets 200 and 201 are mounted as indicated, the armature 10 will be permanently polarized as a south pole, coil sections 92 and 94 are so arranged in the circuit that with the parts arranged as shown with the free end of the armature adjacent the pole piece 204 and with contacts 38, 70 and 40, 72 closed, completion of the circuit by closing switch 110 will serve to make pole piece 204 a south pole and pole piece 205 a north pole. The armature 10 will thereby be repelled by pole 204 and attracted by pole 205 and will move rapidly toward the latter. As in the previous form, during movement, operation of the contacts will reverse the direction of the magnetic field due to the coil sections 92 and 94 and the armature will move to its initial position. Here again, a reversal of the direction of the magnetic field will occur and a high frequency vibration of the armature will result due to the interaction of the unidirectional and alternating magnetic field 8.

Referring to Figs. 9 and 11, a modified form of stop 206 is shown in connection with the spring contact arms 62 and 64. As illustrated, the stop 206 is formed from a metal plate and one such stop is positioned over each of the arms 62 and 64 as shown. In assembling the parts, the contact arms bear against the outer portions of the stops with a slight tension, and in operation, the stops 206 operate and function in the same manner as the stops or lugs 90 of Fig. 1. It will be understood that the stops 206 of Figs. 9 and 11 may be used in Fig. 1, if desired.

There has thus been provided by the present invention, a novel and improved electromagnetic vibrator wherein the armature is positively vibrated at a relatively high frequency through the mutual cooperation between an alternating magnetic field and a unidirectional magnetic field. Several novel features of construction are presented by the present invention which materially contribute to the high frequency of vibration as well as the increased efficiency of operation. For example, the contact structure is positioned adjacent the supported end of the armature thus securing a relatively high contact pressure and resultant reduced contact resistance during operation. Again, in the form shown in Fig. 1, the use of the magnet 20, the pole pieces 22, 24 and the relative positioning of the latter with respect to the armature end, secures a relatively simple unidirectional field structure which includes a single pair of relatively small parts to be magnetized. A minimum loss of field strength is hence realized, thereby insuring a unidirectional field of great strength for cooperation with the varying field produced by the polarization of the armature, for more effective vibration of the latter.

In addition to the foregoing, the provision of the lips or stops 90 or the stops 206 in connection with the motion of the arms 62 and 64 and the movable contacts carried thereby insures a highly efficient motion of the movable contacts during vibration of the armature. This feature is of prime importance in the elimination of undesirable frequencies in the yielding supporting arms 62 and 64 and hence a more positive and smoother operation is achieved.

While several forms of the invention have been shown and described herein, it will be understood that various changes may be made therein, as will readily appear to those skilled in the art, without departing from the spirit of the invention. Reference will therefore be had to the appended claims for a definition of the limits of the invention.

What is claimed is:

1. A polarized vibrator for converting low potential direct current to a pulsating current, comprising a substantially rigid current-conducting armature, a support including a pair of spaced-apart arms, a flexible member for mounting one end of the armature on the support for vibration between said arms, means for creating a unidirectional magnetic field adjacent the extremity of the free end of the armature comprising a pair of spaced-apart pole pieces carried by said support and positioned slightly beyond the extremity of the free end of the armature, a stationary winding around the armature adjacent the free end thereof, and means including said armature, said winding and contacts supported by the armature adjacent the supported end and between the latter and said winding for polarizing said free end in opposite senses so that the coaction between the unidirectional field and the oppositely polarized armature will cause the latter to vibrate at high frequency.

2. A polarized vibrator for converting low potential direct current to a pulsating current, comprising a support having a pair of spaced-apart arms, a substantially rigid armature resiliently mounted at one end for lateral vibration between said arms, means for subjecting the other end at the extremity thereof to the action of a unidirectional magnetic field comprising a permanent magnet and a pair of L-shaped pole pieces carried by the support and embracing opposite poles of the magnet, the pole pieces having spaced-apart ends spaced slightly beyond the extremity of said other end and forming an air gap for influencing the extremity of said other end, and means coacting with said unidirectional field to cause lateral vibration of said armature at a relatively high frequency comprising means for polarizing said other end from a direct current source, and means including circuit connections controlled solely by vibration of the armature for periodically reversing the polarization of said other end, said circuit connections including said armature and contacts carried by the armature adjacent said one end, said polarizing means including a stationary winding around the armature between said contacts and said extremity.

3. A polarized electromagnetic vibrator for converting low-potential direct current to a pulsating current, comprising a support having a pair of spaced-apart members, a substantially rigid armature of magnetic material, means including a flexible spring hinge for mounting one end of the armature on the support to allow lateral vibration of the latter between said members, a pair of flexible arms carried by the armature and respectively disposed on either side thereof, a movable contact supported on the free end of each arm, a pair of stationary contacts for respective engagement by said movable contacts during vibration of the armature, each of said stationary contacts being carried by a rigid arm supported by the support, means for subjecting the opposite end of the armature to the influence of a unidirectional magnetic field to normally move the armature in one direction or the other to effect engagement between one or the other of said movable contacts and its associated stationary contact, means comprising circuit connections including said contacts and said armature for polarizing said opposite end of the armature in opposite senses to cause vibration of the armature at high frequency due to the interaction between the unidirectional field and the field caused by said polarization, and stop means carried by the armature on opposite sides thereof for limiting the movement of said flexible arms in a direction away from the armature, each of said flexible arms being preloaded to bear against the respective stop means with a predetermined tension for eliminating vibration of the movable contacts when engaged with the stationary contacts during vibration of the armature.

4. A polarized electromagnetic vibrator for converting low potential direct current to a pulsating current, comprising a support having a pair of spaced-apart members, a substantially rigid armature of magnetic material, means including a flexible spring hinge for mounting one end of the armature to allow lateral vibration of the latter between said members, a pair of flexible arms carried by the armature and respectively disposed on either side thereof, a movable contact supported on the free end of each arm, a pair of stationary contacts for respective engagement by said movable contacts during vibration of the armature, each of said stationary contacts being carried by a rigid arm supported by the support means for subjecting the opposite end of the armature to the influence of a unidirectional magnetic field to normally move the armature in one direction or the other to effect engagement between one or the other of said movable contacts and its associated stationary contact, means comprising circuit connections including said contacts and said armature for polarizing said opposite end of the armature in opposite senses to cause vibration of the armature at high frequency due to the interaction between the unidirectional field and the field caused by said polarization, and a pair of stops formed on said armature for respective engagement with the free ends of said resilient arms to limit the movement of said free ends in a direction away from the armature but allowing movement of the armature toward each flexible arm when each movable contact engages its cooperating stationary contact during vibration of the armature, each of said flexible arms being preloaded to bear against the respective stops with a predetermined tension for eliminating vibration of the movable contacts when the latter engage the stationary contacts.

5. A polarized vibrator for converting low potential direct current to a pulsating current comprising a support of non-magnetic material and including a pair of spaced-apart members, an elongated rigid armature of permeable material, means including a flexible strip for supporting said armature at one end on the support so that the free end is capable of lateral vibration between said members, and means for positively driving said armature in opposite directions to effect said lateral vibration comprising a permanent magnet means for producing a unidirectional magnetic field, and a means for producing an alternating magnetic field, the last named means including a stationary winding carried by the support and constructed and arranged to be energized in opposite directions from a direct current source, one of the driving means including a pair of L-shaped pole pieces carried by the support and having spaced-apart ends spaced slightly beyond the extremity of said free end and forming an air gap for magnetically influencing the extremity of said free end, and the other of the driving means being constructed and arranged to polarize the armature, and means comprising circuit connections controlled solely by lateral vibration of the armature for periodically energizing the winding in opposite directions to alternately effect a simultaneous repelling and attracting action between said free end and said pole pieces to cause vibration of the armature at a substantially high frequency, said circuit connections including said armature and stationary contacts supported from the frame on opposite sides of the armature and positioned between the supported end of the latter and said winding.

6. A polarized vibrator for converting low potential direct current to a pulsating current comprising a support of non-magnetic material and including a pair of spaced-apart members, an elongated rigid armature of permeable material, means including a flexible strip for supporting said armature at one end on the support so that the free end is capable of lateral vibration between said members, and means for positively driving said armature in opposite directions to effect said lateral vibration comprising a permanent magnet means for producing a unidirectional magnetic field, and a means for producing an alternating magnetic field, the last named means including a stationary winding carried by the support and constructed and arranged to be energized in opposite directions from a direct current source, said winding being disposed around the armature at the free end thereof to periodically reverse the polarization of the armature, said permanent magnet means including a permanent magnet and a pair of L-shaped pole pieces embracing opposite poles of the magnet, the ends of said pole pieces being spaced-apart and spaced slightly beyond the extremity of said free end to magnetically influence the latter, and means comprising circuit connections controlled solely by lateral vibration of the armature for periodically energizing the winding in opposite directions to alternately effect a simultaneous repelling and attracting action between said free end and said pole pieces to cause vibration of the armature at a substantially high frequency, said circuit connections including said armature and stationary contacts supported from the frame on opposite sides of the armature and positioned between the supported end of the latter and said winding.

7. A polarized vibrator for converting low potential direct current to a pulsating current comprising a support of non-magnetic material and including a pair of spaced-apart members, an elongated rigid armature of permeable material, means including a flexible strip for supporting said armature at one end on the support so that the free end is capable of lateral vibration between said members, and means for positively driving said armature in opposite directions to effect said lateral vibration comprising a permanent magnet means for producing a unidirectional magnetic field, and a means for producing an alternating magnetic field, the last named means including a stationary winding carried by the support and constructed and arranged to be energized in opposite directions from a direct current source and including also a pair of pole pieces projecting toward each other and having spaced-apart ends spaced slightly beyond the extremity of said free end to form an air gap for magnetically influencing the extremity of said free end, and said permanent magnet means including a permanent magnet carried by said support and positioned to polarize the free end of the armature in one sense, circuit connections controlled solely by lateral vibration of the armature for periodically energizing the winding in opposite directions to alternately effect a simultaneous repelling and attracting action between said free end and said pole pieces to cause vibration of the armature at a substantially high frequency, said circuit connections including said armature and stationary contacts supported from the frame on opposite sides of the armature and positioned between the supported end of the latter and said winding.

8. A polarized vibrator for converting low potential direct current to a pulsating current comprising a support of non-magnetic material and including a pair of spaced-apart members, an elongated rigid armature of permeable material, means including a flexible strip for supporting said armature at one end on the support so that the free end is capable of lateral vibration between said members, and means for positively driving said armature in opposite directions to effect said lateral vibration comprising a permanent magnet means for producing a unidirectional magnetic field, and a means for producing an alternating magnetic field, the last named means including a stationary winding carried by the support and constructed and arranged to be energized in opposite directions from a direct current source and including also a pair of pole pieces projecting toward each other and having spaced-apart ends spaced slightly beyond the extremity of said free end to form an air gap for magnetically influencing the extremity of said free end, and said permanent magnet means including a pair of permanent magnets carried by the support and positioned on opposite sides of the free end of the armature to polarize said free end in one sense, circuit connections controlled solely by lateral vibration of the armature for periodically energizing the winding in opposite directions to alternately effect a simultaneous repelling and attracting action between said free end and said pole pieces to cause vibration of the armature at a substantially high frequency, said circuit connections including said armature and stationary contacts supported from the frame on opposite sides of the armature and positioned between the supported end of the latter and said winding.

LAURENCE H. COLLINS.
EDWIN COMER SMITH.

REFERENCES CITED

The following references are of record in the file of this patent:

UNITED STATES PATENTS

| Number | Name | Date |
|---|---|---|
| 2,013,513 | Dressel | Sept. 3, 1935 |
| 2,402,815 | Heutten | June 25, 1946 |
| 1,671,245 | Kraus | May 29, 1928 |
| 1,924,082 | Barrett | Aug. 22, 1933 |
| 2,290,725 | Bartels et al. | July 21, 1942 |
| 2,366,618 | Harrison | Jan. 2, 1945 |
| 1,029,388 | McIntyre | June 11, 1912 |
| 1,315,975 | Lincoln | Sept. 16, 1919 |
| 1,633,809 | Moon | Mar. 27, 1928 |

FOREIGN PATENTS

| Number | Country | Date |
|---|---|---|
| 557,089 | Great Britain | Nov. 3, 1943 |